Oct. 11, 1966
N. O. ROSAEN
3,278,030
SUPERCHARGED FILTER UNIT
Filed Sept. 17, 1962
2 Sheets-Sheet 2
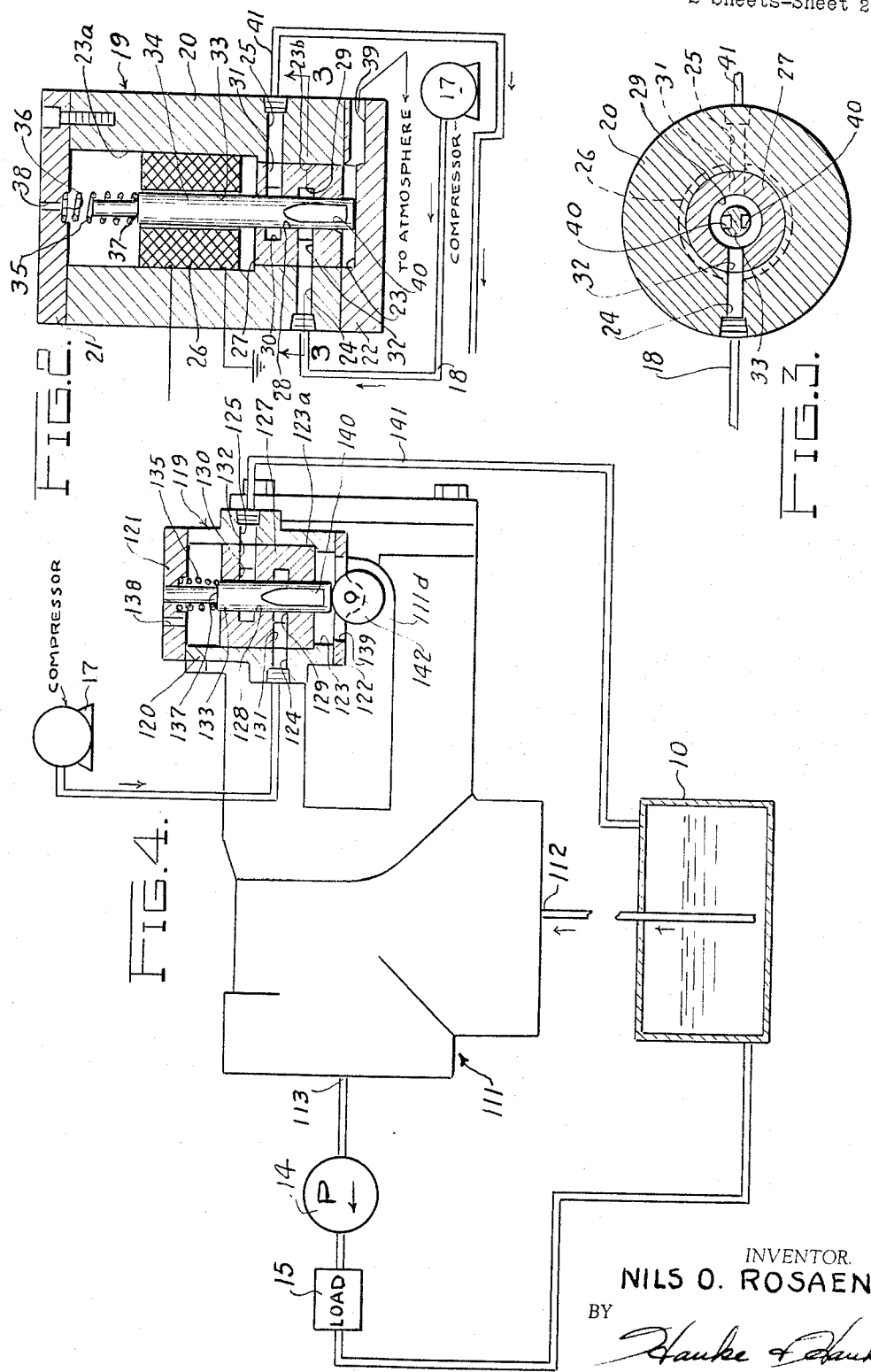
INVENTOR.
NILS O. ROSAEN
BY
Hauke & Hauke
ATTORNEYS

# United States Patent Office 3,278,030
Patented Oct. 11, 1966

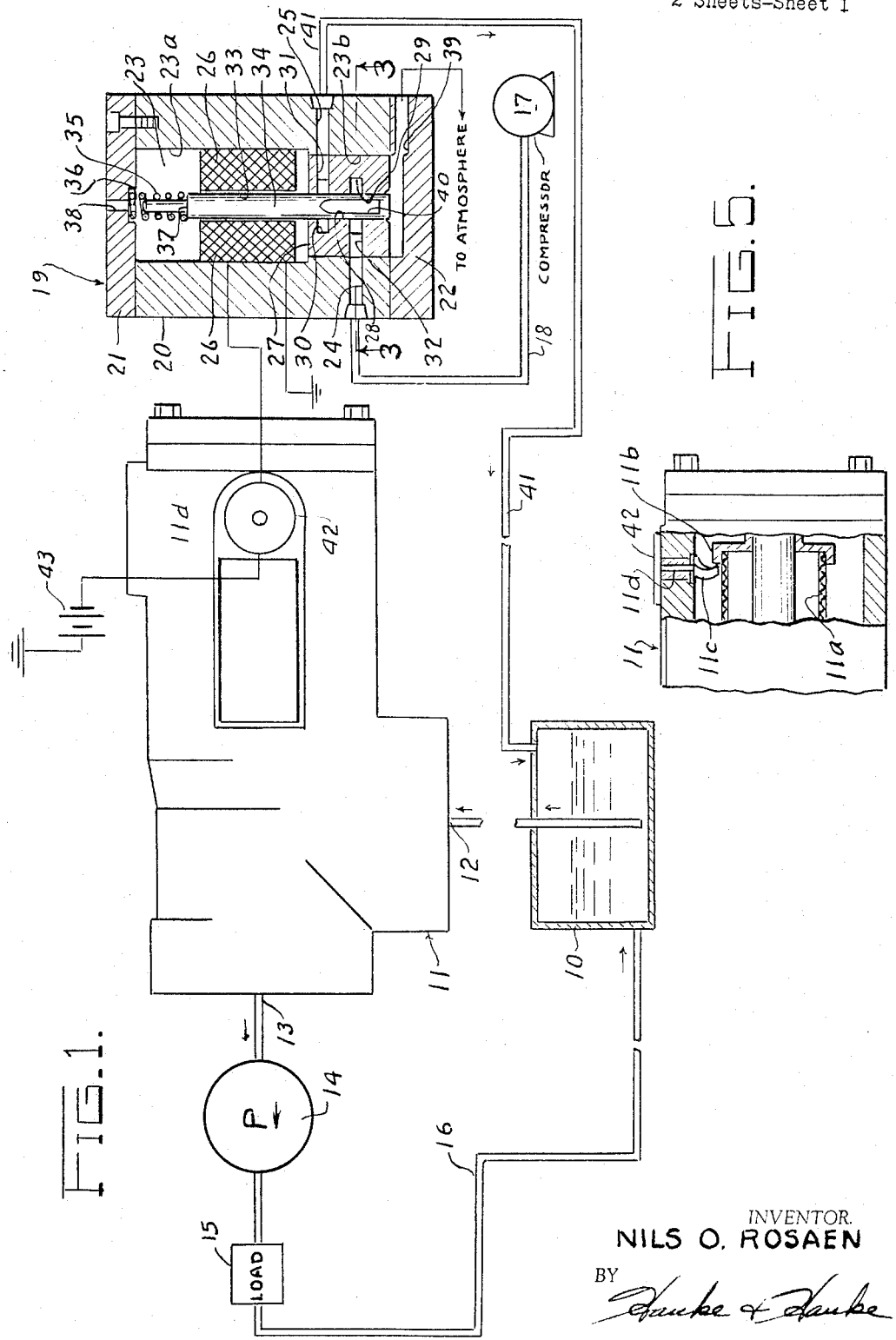

3,278,030
SUPERCHARGED FILTER UNIT
Nils O. Rosaen, Bloomfield Hills, Mich., assignor to The Rosaen Filter Company, Hazel Park, Mich., a corporation of Michigan
Filed Sept. 17, 1962, Ser. No. 223,980
11 Claims. (Cl. 210—65)

The present invention relates to filtering systems and more particularly to such a system having means for supercharging the fluid being filtered.

Pump cavitation is a well known phenomena in fluid filtering systems and results when too great a pressure differential occurs across the pump. If permitted cavitation will soon destroy the pump. A pressure differential increase across the pump can have many causes including low temperature of the fluid and excessively long supply lines. Heretofore many means have been provided to prevent cavitation including the system disclosed in my copending application Serial No. 137,330, filed Sept. 11, 1961, now Patent No. 3,139,905. These have generally taken the form of additional supply pumps to boost the flow rate from the reservoir to the pressure pump or have utilized a modified pressure pump.

It is an object of the present invention to solve the aforesaid difficulty by providing a fluid filtering system having a pressure sealed reservoir and means automatically operable to increase the pressure in the reservoir when the pressure differential across the pump has increased to or beyond a set value.

It is yet another object of the present invention to reduce the costs of operating fluid filtering systems by providing an economical means of preventing pump cavitation.

Still further objects and advantages will readily occur to one skilled in the art to which the invention pertains upon reference to the following drawings illustrating a preferred filtered system embodying the present invention in which like reference characters refer to like parts throughout the several views and in which FIG. 1 is a diagrammatic view of a preferred fluid pressure system embodying the present invention, FIG. 2 is a cross-sectional view of the valve member of FIG. 1 in a second position, FIG. 3 is a cross-sectional view of said valve taken substantially on the line 3—3 of FIG. 1, FIG. 4 is a diagrammatic view of another preferred fluid pressure system embodying the present invention, and FIG. 5 is a fragmentary sectional view of a preferred filtering device.

Now referring to the drawings for a more detailed description of the present invention a preferred fluid system is shown in FIG. 1 as comprising a pressure sealed fluid reservoir 10. A fluid filter device 11 is provided with an inlet 12 connected to the reservoir 10 and an outlet 13 connected to the inlet side of a pressure pump 14. The outlet side of the pump 14 is connected to a fluid user 15 which is in turn connected by a return line 16 to the reservoir 10.

A valve device 19 preferably comprises a substantially cylindrical housing 20 closed at each end by cap members 21–22 to form a substantially cylindrical chamber 23. The chamber 23 is provided with an enlarged end portion 23a which carries an electromagnetic coil 26 and a reduced end portion 23b which carries a substantially cylindrical insert 27. A radial inlet passage 24 is provided in the housing 20 and provides communication between the chamber 23 and a conduit 18. The conduit 18 is connected to the outlet side of a compressor 17. A radial outlet passage 25 is provided in the housing 20 in a position axially spaced from the inlet passage 24 and provides communication between the chamber 23 and a pressure line 41. The pressure line 41 is connected to the top of the reservoir 10.

The insert 27 is provided with an axially extending recess 28 and a pair of axially spaced annular recesses 29–30 communicating therewith. A radial passage 31 provides communication between the inlet passage 24 and the annular recess 29 and a radial passage 32 provides communication between the outlet passage 25 and the annular recess 30. A valve member 33 is axially slidably carried in the recess 28.

The valve member 33 is magnetic and has an end portion 34 disposed within the core of the coil 26 so that the valve member 33 is operable upon the coil 26 being energized to move from the position illustrated in FIG. 2 toward the position illustrated in FIG. 1.

A spring member 35 is seated in a recess 36 provided in the cap member 21 and bears against a shoulder 37 provided on the valve member 33 to urge the valve member 33 longitudinally toward the position shown in FIG. 2. A vent opening 38 is provided in the cap member 21 and an outlet 39 open to the atmosphere is provided in the cap member 22.

The valve member 33 is preferably provided with axially extending dish portions 40 which provides communication between annular receses 29–30 when the valve member 33 is in the position shown in FIG. 1 and between the annular recess 29 and the outlet 39 when the valve member 33 is in the position shown in FIG. 2.

The preferred filter device 11 as can best be seen in FIG. 5 is of a type disclosed in my copending patent application Serial No. 26,046, filed May 2, 1960, now abandoned in favor of a continuation application Serial No. 331,640 filed December 11, 1963, in which a filter cartridge 11a is actuated toward the left (as shown) on an increase in pressure differential across the filter cartridge 11a. The filter cartridge 11a actuates a flange 11b which on movement actuates an arm 11c to rotate a pin 11d.

The pin 11d is connected directly to a potentiometer 42 which is connected to a source of electrical power 43 as shown in FIG. 1. The potentiometer 42 is electrically connected to the coil 26 and is operable to energize same when pressure differential produces a predetermined movement in the filter device 11.

In operation, fluid is pumped from the reservoir 10, through the filter device 11, to the user 15 and back to the reservoir 10 by the pump 14. The potentiometer 42 senses the changes in pressure differential across the filter device 11 caused by changes in the viscosity of the fluid or by the foreign matter being collected by the filter cartridge 11a. As the pressure differential across the filter device 11 increases, the fluid pressure in the inlet of the pump 14 will decrease.

As long as the fluid flow to the pump 14 is of a high enough value to prevent pump cavitation, the coil 26 remains deenergized and the valve member 33 will be in the position illustrated in FIG. 2. The pressure produced by the compressor 17 will be vented to the atmosphere through the passage 24, the recess 29, the dished portions 40 of the valve member 33, the chamber 23, and the outlet 39.

However, if the filter device 11 senses too great an increase in the pressure differential across the cartridge 11a the pin 11d will be rotated an amount causing the potentiometer 42 to energize the coil 26. This will cause the valve member 33 to move toward the position shown in FIG. 1 against the force of the spring 35 to variably open communication between the recesses 29–30 and thus between the inlet 24 and the outlet 25. Pressure created by the compressor 17 will then increase the pressure in the sealed reservoir 10 maintaining the fluid flow through the filter device 11 to avoid cavitation. The coil 26 will then be varably deenergized by any resultant decrease in pressure differential across the filter device 11 and the valve member 33 will be returned by the spring member 35 to the position shown in FIG. 2.

FIG. 4 illustrates another preferred fluid system as comprising a modified filter device 111 and a modified valve device 119. The filter device 111 has an inlet 112 connected to the pressure sealed reservoir 10 and an outlet 113 connected to the intake side of the pump 14. The pump 14 is connected to the user 15 which is in turn connected to the reservoir 10.

The filter device 111 is substantially as described above and has a pin 111d which is rotated in response to change in the pressure differential across the filter device 111. The pin 111d carries a cam member 142.

The valve device 119 comprises a cylindrical housing 120 having ends caps 121 and 122 and chamber 123. An annular shoulder 123a is provided in the housing 120 which carries a cylindrical insert 127. The insert 127 is provided with an axially extending recess 128 and a pair of axially spaced annular recess 129–130 communicating therewith. An inlet 124 is provided in the housing 120 and is connected to the outlet side of the compressor 17. A radial passage 131 in the insert 127 provides communication between the inlet 124 and the recess 129. An outlet 125 is provided in housing 120 and is connected to the reservoir 10 by pressure line 141. A radial passage 132 provides communications between the annular recess 130 and the outlet 125.

A valve member 133 is axially slidably carried in the end cap 121 and the recess 128. The end cap 122 is provided with an opening 139 and the valve device 119 is positioned such that the cam member 142 of the filter device 111 extends into the opening 139 to be engaged by the end of the valve member 133. A spring 135 is biased between the cap member 121 and a shoulder 137 provided on the valve member 133 to urge the valve member 133 to engage the cam member 142. A relief port 138 is provided in the cap member 121. The valve member 133 is provided with dished portions 140 disposed to open and close communication between the recesses 129–130 upon axial movement of the valve member 133.

With the valve member 133 in the position illustrated in FIG. 4 pressure created by the compressor 17 is exhausted through the recess 129, the dished portion 140 and the opening 139.

As the pressure differential increases across the filter device 111 producing a reduced fluid pressure to the pump the pin 11d rotates causing the cam member 142 to move the valve member 133 axially against the force of the spring 135. Movement of the valve member 133 variably opens communication between the recesses 129–130 and thus between the inlet 124 and outlet 125 causing compressor pressure to be directed to the reservoir 10. The increased pressure in the reservoir 10 maintains the fluid flow across the filter device 111 and increases the inlet pump pressure and eliminates pump cavitation.

Although I have described but two embodiments of the present invention it is apparent that many changes and modifications may be made without departing from the spirit of the invention or the scope or the appended claims.

I claim:
1. A fluid filtering system comprising
(a) a pressure sealed fluid reservoir,
(b) a pump having an outlet adapted to be connected to a fluid user and an inlet,
(c) a fluid filtering device connected intermediate said reservoir and said inlet,
(d) means sensing changes in the pressure differential across said filtering device, and
(e) means automatically operable to increase the pressure in said reservoir upon said pressure differential reaching a predetermined value.

2. The system as defined in claim 1 and in which said last mentioned means comprises,
(a) a compressor having an outlet connected with said reservoir, and
(b) valve means disposed intermediate said compressor outlet and said reservoir and operably connected to said pressure differential sensing means,
(c) said valve means being operable to close communication between said compressor and said reservoir and to vent the pressure produced by said compressor until said predetermined pressure differential has been reached.

3. The system as defined in claim 2 and in which said pressure differential sensing means comprises a cam member adapted to be rotated in response to changes in pressure differential across said filter device and said valve means comprises
(a) a housing having an inlet connected intermediate said compressor outlet, a first outlet connected to said reservoir, and a second outlet connected to the atmosphere,
(b) a longitudinally slidable valve member carried in said housing intermediate said inlet and said outlets and being operable upon longitudinal movement to open and close communication therebetween, and
(c) one end of said valve member engaging the surface of said cam member to be moved longitudinally upon rotation of said cam member whereby changes in pressure differential across said filter device will produce a corresponding longitudinal movement of said valve member to open and close communication between said inlet and outlets.

4. The system as defined in claim 2 and in which said pressure differential sensing means comprises a potentiometer electrically connected to a source of electrical power and said valve means comprises,
(a) a housing having an inlet connected intermediate said compressor outlet, a first outlet connected to said reservoir, and a second outlet connected to the atmosphere,
(b) a longitudinally slidable magnetic valve carried in said housing intermediate said inlet and said outlets and being operable upon longitudinal movement to open and close communication therebetween,
(c) an electromagnetic coil carried in said housing adjacent said valve member and being electrically connected to said potentiometer to be energized thereby upon said pressure differential increasing to a predetermined value,
(d) said valve member being disposed within the magnetic field produced by said electromagnetic coil and operable upon said coil being energized to move from a position in which communication is open between said inlet and said second outlet and closed between said inlet and said first outlet to a position opening communication between said inlet and said first outlet and closing communication between said inlet and said second outlet.

5. A valve device for use in a fluid filtering system having a pump, a pressure sealed reservoir connected with said pump, a filter device disposed intermediate said pump and said reservoir, means sensing changes in the pressure differential across said filter device, and a compressor having an outlet, said valve device comprising
(a) a housing having an inlet connected to said outlet of said compressor, a first outlet connected to said reservoir and a second outlet communicating with the atmosphere,
(b) a valve member slidably carried in said housing intermediate said inlet and said first and second outlets and being operable upon sliding movement thereof to variably open and close communication between said inlet and said first and second outlets, and
(c) means operably connecting said sensing means and said valve member and being operable to move said valve member toward an open position with respect to said inlet and said first outlet and toward a closed position with respect to said inlet and said second outlet as said pressure differential increases.

6. The device as defined in claim 5 and including a spring member carried in said housing and urging said valve member to a closed position with respect to said inlet and said first outlet and toward an open position with respect to said inlet and said second outlet.

7. The device as defined in claim 6 and in which said means comprises
   (a) an electromagnetic coil carried in said housing being electrically connected to said pressure sensing means,
   (b) said valve member being carried by said coil within the field of said coil and being operable to move toward an open position with respect to said inlet and said second outlet as said coil receives an electrical charge, and
   (c) said pressure differential sensing means including means operable to electrically charge said coil when the increase in pressure differential across said filter device has reached a predetermined value.

8. In a valve device for use in a fluid filtering system having a pump, a pressure sealed reservoir connected with said pump, a filter device disposed intermediate said pump and said reservoir, means sensing changes in the pressure differential across said filter device and a compressor having an outlet and adapted to supply air pressure from said outlet to said reservoir, said valve device comprising
   (a) a substantially cylindrical housing having an inlet connected to said outlet of said compressor and an outlet connected to said reservoir,
   (b) said housing being closed at each end by a cap member to form a longitudinally extending chamber connecting said inlet and said outlet,
   (c) one of said cap members having an outlet open to the atmosphere,
   (d) an electromagnetic coil electrically connected to said pressure differential sensing means and carried in one end of said chamber,
   (e) a substantially cylindrical insert carried in the other end of said chamber and having a first passage communicating with said inlet, a second passage communicating with said outlet in said housing,
   (f) a valve member longitudinally slidably carried in said insert,
   (g) said valve member having a portion disposed within the field of said coil whereby when said coil becomes energized said valve member will be moved longitudinally within said insert,
   (h) said valve member being provided with a longitudinally extending recess normally providing communication between said inlet and said outlet in said cap member,
   (g) said valve member being operable upon being moved by said coil to open communication between said insert recesses whereby communication between the compressor and the reservoir is opened.

9. A method of supercharging a fluid filtering system having a pressure sealed reservoir, a pump connected to said reservoir, and a filter device connected intermediate said pump and said reservoir, said method comprising
   (a) sensing the changes in pressure differential across said filter device, and
   (b) increasing the pressure in said pressure sealed reservoir when said pressure differential has reached a predetermined value.

10. A fluid supply system comprising
    (a) a pressure sealed fluid reservoir,
    (b) a pump having an inlet connected with said reservoir,
    (c) means operable to increase the pressure in said reservoir in response to a predetermined pressure decrease at the inlet of said pump,
    (d) said means comprising a compressor system connected with said reservoir to supply pressure thereto, a pressure sensing means connected intermediate said pump and said reservoir, and control means operably connected with said sensing means and comprising a valve actuated in response to changes in the pressure as sensed by said pressure sensing means to variably relieve pressure from said compressor system.

11. The fluid supply system as defined in claim 10 and in which
    (a) said valve has an electrical actuator therefor and
    (b) said sensing means includes a potentiometer energizing said actuator.

References Cited by the Examiner

UNITED STATES PATENTS

| 2,499,494 | 3/1950 | Greer | 210—416 X |
| 2,536,663 | 1/1951 | Schaer | 210—168 |
| 3,091,336 | 5/1963 | Hirs | 210—387 X |

FOREIGN PATENTS 580,604  9/1946  Great Britain.

REUBEN FRIEDMAN, *Primary Examiner.*

HERBERT L. MARTIN, *Examiner.*

D. M. RIESS, R. A. CATALPA, *Assistant Examiners.*